(12) United States Patent
Melanson et al.

(10) Patent No.: US 9,628,909 B2
(45) Date of Patent: *Apr. 18, 2017

(54) SYSTEMS AND METHODS FOR USING A SPEAKER AS A MICROPHONE

(71) Applicant: Cirrus Logic, Inc., Austin, TX (US)

(72) Inventors: John L. Melanson, Austin, TX (US); Eric Swanson, Buda, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,803

(22) Filed: Nov. 4, 2015

(65) Prior Publication Data

US 2016/0057532 A1    Feb. 25, 2016

Related U.S. Application Data

(63) Continuation of application No. 13/915,780, filed on Jun. 12, 2013, now Pat. No. 9,215,532.

(Continued)

(51) Int. Cl.
*H04R 21/02* (2006.01)
*H04R 3/00* (2006.01)
(Continued)

(52) U.S. Cl.
CPC .............. *H04R 3/005* (2013.01); *H04R 1/04* (2013.01); *H04R 1/1041* (2013.01); *H04R 3/04* (2013.01);
(Continued)

(58) Field of Classification Search
CPC  H04R 2499/11; H04R 19/016; H04R 1/1041; H04R 2201/107; H04R 3/00; H04M 1/0202; H04M 1/271

USPC ..... 381/365, 57–59, 93, 94.1, 116, 117, 111, 381/113, 120, 96, 191; 455/569.1, 575.1, 455/90.2, 553.1, 74.1, 88, 557, 573; 379/420.01, 433.02, 433.03, 379/388.01–388.06

See application file for complete search history.

(56) References Cited

U.S. PATENT DOCUMENTS 7,274,794 B1    9/2007    Rasmussen
7,334,735 B1    2/2008    Antebi et al.
(Continued)

FOREIGN PATENT DOCUMENTS

CN    10527637 A    11/2015
GB    2526727 A    12/2015

OTHER PUBLICATIONS

International Search Report and Written Opinion of the International Searching Authority, International Patent Application No. PCT/US2014/024238, 11 pages.

*Primary Examiner* — Paul S Kim
*Assistant Examiner* — Norman Yu
(74) *Attorney, Agent, or Firm* — Jackson Walker L.L.P.

(57) ABSTRACT

In accordance with methods and systems of the present disclosure, a mobile device may include an enclosure adapted such that the enclosure is readily transported by a user of the mobile device, a speaker associated with the enclosure for generating sound, and a controller within the enclosure, communicatively coupled to the speaker. The controller may be configured to receive a signal from the speaker, the signal induced at least in part by sound incident on the speaker other than sound generated by the speaker and process the signal.

27 Claims, 3 Drawing Sheets

Related U.S. Application Data

(60) Provisional application No. 61/782,388, filed on Mar. 14, 2013.

(51) Int. Cl.
 *H04R 1/04* (2006.01)
 *H04W 52/02* (2009.01)
 *H04R 1/10* (2006.01)
 *H04R 3/04* (2006.01)
 *H04R 19/02* (2006.01)
 *H04R 19/04* (2006.01)
 *H03G 3/20* (2006.01)

(52) U.S. Cl.
 CPC ............. *H04R 19/02* (2013.01); *H04R 19/04* (2013.01); *H04W 52/0251* (2013.01); *H04W 52/0254* (2013.01); *H04R 2400/01* (2013.01); *H04R 2499/11* (2013.01)

(56) References Cited

U.S. PATENT DOCUMENTS

| | | |
|---|---|---|
| 7,881,480 B2 | 2/2011 | Buck et al. |
| 8,243,961 B1 | 8/2012 | Morrill |
| 8,326,379 B2 | 12/2012 | Slevin |
| 9,407,991 B2 | 8/2016 | Melanson et al. |
| 2003/0118201 A1* | 6/2003 | Leske .............. H04R 3/00 381/117 |
| 2003/0202673 A1 | 10/2003 | Tajima et al. |
| 2006/0074658 A1* | 4/2006 | Chadha .............. G10L 17/00 704/246 |
| 2007/0230712 A1 | 10/2007 | Belt et al. |
| 2010/0027817 A1 | 2/2010 | Dyer et al. |
| 2011/0181452 A1 | 7/2011 | Raifel et al. |
| 2013/0190041 A1 | 7/2013 | Andrews |
| 2014/0270312 A1 | 9/2014 | Melanson et al. |
| 2015/0208176 A1 | 7/2015 | Melanson et al. |

* cited by examiner

SYSTEMS AND METHODS FOR USING A SPEAKER AS A MICROPHONE

RELATED APPLICATION

The present disclosure claims priority to U.S. Non-Provisional patent application Ser. No. 13/915,780, filed Jun. 12, 2013, which claims priority to U.S. Provisional Patent Application Ser. No. 61/728,388, filed Mar. 14, 2013, which is are incorporated by reference herein in its their entirety.

FIELD OF DISCLOSURE

The present disclosure relates in general to a mobile device, and more particularly, to using a speaker as a microphone in a mobile device in order to potentially improve power performance and/or audio performance of the mobile device.

BACKGROUND

Battery life in mobile devices (e.g., smart phones, tablets, handheld computers, other portable devices, etc.) is often a key design constraint. Accordingly, mobile devices are capable of being placed in a lower-power state or "sleep mode." In this low-power state, generally only minimal circuitry is active, such minimal circuitry including components necessary to sense stimulus for activating higher-power modes of operations. Typically, one of the components remaining active is one or more capacitive microphones, in order to sense for voice activation commands for activating a higher-power state. Often, these microphones consume significant amounts of power, thus reducing battery life of mobile devices.

Another shortcoming of capacitive microphones typically used in mobile devices are that they are typically suited for receiving low-volume sounds with a limited frequency range. However, it may be desirable to record loud sounds, such as a rock concert, which are above the volume range for which most capacitive microphones used in mobile devices are suited. Amplifier circuitry and bias electronics used to amplify electric signals transduced by sound received by such microphones typically draw significant amounts of power, and adapting such circuitry to increase the audio performance of microphones would likely increase power consumption and component cost. Some mobile device manufacturers have overcome this shortcoming by including two capacitive microphones: one adapted for low-volume sound, and one adapted for high-volume sound. However, such a solution may increase cost.

SUMMARY

In accordance with the teachings of the present disclosure, the disadvantages and problems associated with performance of microphones in a mobile device may be reduced or eliminated.

In accordance with embodiments of the present disclosure, a mobile device may include an enclosure adapted such that the enclosure is readily transported by a user of the mobile device, a speaker associated with the enclosure for generating sound, and a controller within the enclosure, communicatively coupled to the speaker. The controller may be configured to receive a signal from the speaker, the signal induced at least in part by sound incident on the speaker other than sound generated by the speaker and process the signal.

In accordance with these and other embodiments of the present disclosure, a method may include generating, by a speaker associated with an enclosure adapted such that the enclosure is readily transported by a user of the mobile device, a signal, the signal induced at least in part by sound incident on the speaker other than sound generated by the speaker and processing the signal.

In accordance with these and other embodiments of the present disclosure, a mobile device may include an enclosure adapted such that the enclosure is readily transported by a user of the mobile device, a first speaker associated with the enclosure for generating sound, a second speaker associated with the enclosure for generating sound, and a controller within the enclosure, communicatively coupled to the speaker. The controller may be configured to receive a first signal from the first speaker, the first signal induced at least in part by sound incident on the first speaker other than sound generated by the first speaker, receive a second signal from the first speaker, the second signal induced at least in part by sound incident on the second speaker other than sound generated by the second speaker, process at least one of the first signal and the second signal to determine at least one characteristic of sound incident on the mobile device, select one of the first speaker and the second speaker as a signal source for incident sound based on at least one of the volume level and the frequency; and select the other one of the first speaker and the second speaker to generate sound based on at least one of the volume level and the frequency.

In accordance with these and other embodiments of the present disclosure, a method may include generating, by a first speaker associated with an enclosure adapted such that the enclosure is readily transported by a user of the mobile device, a first signal, the first signal induced at least in part by sound incident on the first speaker other than sound generated by the first speaker. The method may also include generating, by a second speaker associated with the enclosure, a second signal, the second signal induced at least in part by sound incident on the second speaker other than sound generated by the second speaker. The method may additionally include processing at least one of the first signal and the second signal to determine at least one characteristic of sound incident on the mobile device. The method may further include selecting one of the first speaker and the second speaker as a signal source for incident sound based on at least one of the volume level and the frequency. The method may also include selecting the other one of the first speaker and the second speaker to generate sound based on at least one of the volume level and the frequency.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
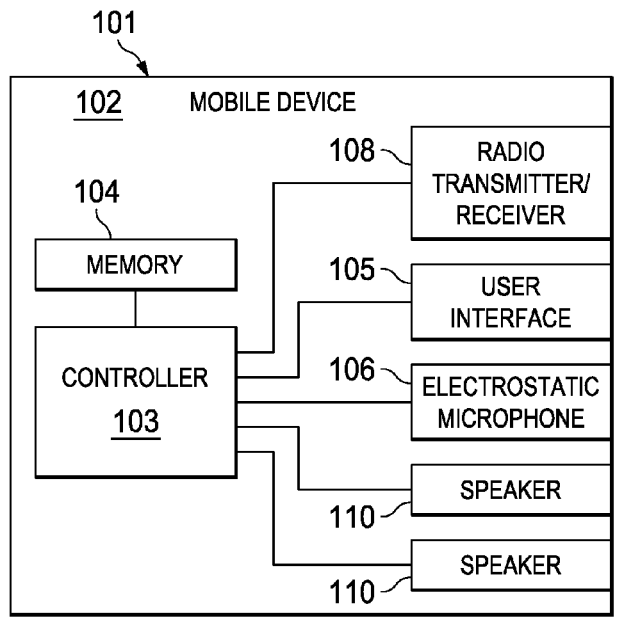
FIG. 1 illustrates a block diagram of an example mobile device, in accordance with embodiments of the present disclosure.

FIG. 1 illustrates a block diagram of an example mobile device 102, in accordance with embodiments of the present disclosure. As shown in FIG. 1, mobile device 102 comprises an enclosure 101, a controller 103, a memory 104, a user interface 105, a microphone 106, a radio transmitter/receiver 108, and one or more speakers 110.

Enclosure 101 comprises any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 includes but is not limited to a smart phone, a tablet computing device, a handheld computing device, a personal digital assistant, a notebook computer, or any other device that may be readily transported on a person of a user of mobile device 102.

Controller 103 is housed within enclosure 101 and includes any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and includes any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

User interface 105 may be housed at least partially within enclosure 101, may be communicatively coupled to controller 103, and comprises any instrumentality or aggregation of instrumentalities by which a user may interact with user mobile device 102. For example, user interface 105 may permit a user to input data and/or instructions into user mobile device 102 (e.g., via a keypad and/or touch screen), and/or otherwise manipulate mobile device 102 and its associated components. User interface 105 may also permit mobile device 102 to communicate data to a user, e.g., by way of a display device.

Capacitive microphone 106 may be housed at least partially within enclosure 101, may be communicatively coupled to controller 103, and comprises any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Capacitive microphone 106 may include an electrostatic microphone, a condenser microphone, an electret microphone, a microelectomechanical systems (MEMs) microphone, or any other suitable capacitive microphone.

Radio transmitter/receiver 108 may be housed within enclosure 101, may be communicatively coupled to controller 103, and includes any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

In embodiments in which mobile device 102 includes a plurality of speakers 110, such speakers 110 may serve different functions. For example, in some embodiments, a first speaker 110 may play ringtones and/or other alerts while a second speaker 110 may play voice data (e.g., voice data received by radio transmitter/receiver 108 from another party to a phone call between such party and a user of mobile device 102). As another example, in some embodiments, a first speaker 110 may play voice data in a "speakerphone" mode of mobile device 102 while a second speaker 110 may place voice data when the speakerphone mode is disabled.

Although specific example components are depicted above in FIG. 1 as being integral to mobile device 102 (e.g., controller 103, memory 104, user interface 105, microphone 106, radio transmitter/receiver 108, speakers(s) 110), a mobile device 102 in accordance with this disclosure may comprise one or more components not specifically enumerated above.

In accordance with embodiments of the present disclosure, one or more of speakers 110 may also be employed as a microphone. To illustrate, sound incident on a cone or other sound producing component of a speaker 110 may cause motion in such cone, thus causing motion of the voice coil of such speaker 110, which induces a voltage on the voice coil which may be sensed and transmitted to controller 103 and/or other circuitry for processing, effectively operating as a microphone. Sound detected by a speaker 110 used as a microphone may be used for many purposes, as described below.

For example, in some embodiments a speaker 110 may be used as a microphone to sense voice commands and/or other audio stimulus for "waking up" mobile device 102 from a low-power state and transitioning it to a higher-power state. In such embodiments, when mobile device 102 is in a low-power state, a speaker 110 may communicate electronic signals to controller 103 for processing. Controller 103 may process such signals and determine if such signals correspond to a voice command and/or other stimulus for transitioning mobile device 102 to a higher-power state. If controller 103 determines that such signals correspond to a voice command and/or other stimulus for transitioning mobile device 102 to a higher-power state, controller 103 may activate one or more components of mobile device 102 that may have been deactivated in the low-power state (e.g., capacitive microphone 106, user interface 105).

In some instances, a speaker 110 may be used as a microphone for sound pressure levels or volumes above a certain level, such as the recording of a live concert, for example. In such higher sound levels, a speaker 110 may have a more reliable signal response to sound as compared with capacitive microphone 106. When using a speaker 110 as a microphone, controller 103 and/or other components of mobile device 102 may perform frequency equalization, as the frequency response of a speaker 110 employed as a microphone may be different than capacitive microphone 106. Such frequency equalization may be accomplished using filters (e.g., a filter bank) as is known in the art. In particular embodiments, such filtering and frequency equalization may be adaptive, with an adaptive filtering algorithm performed by controller 103 during periods of time in which both capacitive microphone 106 is active (but not overloaded by the incident volume of sound) and a speaker 110 is used as a microphone. Once the frequency response is equalized, controller 103 may smoothly transition between the signals received from capacitive microphone 106 and speaker 110 by cross-fading between the two.

In these and other embodiments, controller 103 may process signals received from capacitive microphone 106 and one or more speakers 110 employed as microphones in order to perform beamforming or spatial filtering, which is a signal processing technique for directional signal reception. Controller 103 may perform beamforming by combining elements in a phased array in such a way that signals at particular angles experience constructive interference while others experience destructive interference. Beamforming may be in order to achieve spatial selectivity of sounds incident at mobile device 102.

In these and other embodiments, a speaker 110 may be used as a microphone in those instances in which it is not otherwise being employed to emit sound. For example, when mobile device 102 is in a low-power state, a speaker 110 may not emit sound and thus may be employed as a microphone (e.g., to assist in waking mobile device 102 from the low-power state in response to voice activation commands, as described above). As another example, when mobile device 102 is in a speakerphone mode, a speaker 110 typically used for playing voice data to a user when mobile device 102 is not in a speakerphone mode (e.g., a speaker 110 the user typically holds to his or her ear during a telephonic conversation) may be deactivated from emitting sound and in such instance may be employed as a microphone.

However, in other embodiments, a speaker 110 may be used simultaneously as a speaker and a microphone, such that a speaker 110 may simultaneously emit sound while capturing sound. In such embodiments, a cone and voice coil of a speaker 110 may vibrate both in response to a voltage signal applied to the voice coil and other sound incident upon speaker 110. Controller 103 may determine a voltage present on the voice coil, which will include the sum of two voltages: a voltage transmitted (e.g., by controller 103) for generating sound from the speaker 110 and a voltage induced by external sound incident on the speaker 110. By performing signal processing, controller 103 may subtract the voltage attributable to generating sound from the total voltage present on the voice coil, with the remaining voltage being attributable to the external sound incident on the speaker 110.

In these and other embodiments, a speaker 110 may be used as a microphone in order to extend a bass response of mobile device 102 beyond that of capacitive microphone 106. Typical capacitive microphones have limited frequency response, especially at low frequencies. However, when used as a microphone, a speaker 110 may have a better low-frequency response as compared to capacitive microphones typically employed in mobile devices. Thus, controller 103 may filter and sum signals from capacitive microphone 106 and one or more speakers 110 to provide a greater frequency response for reception of sound than might be available from capacitive microphone 106 alone.

In these and other embodiments, mobile device 102 may include at least two speakers 110 which may be selectively used to transmit sound or as a microphone. In such embodiments, each speaker 110 may be optimized for performance at a particular volume level range and/or frequency range, and controller 103 may select which speaker(s) 110 to use for transmission of sound and which speaker(s) 110 to use for reception of sound based on detected volume level and/or frequency range.

Figure 2:
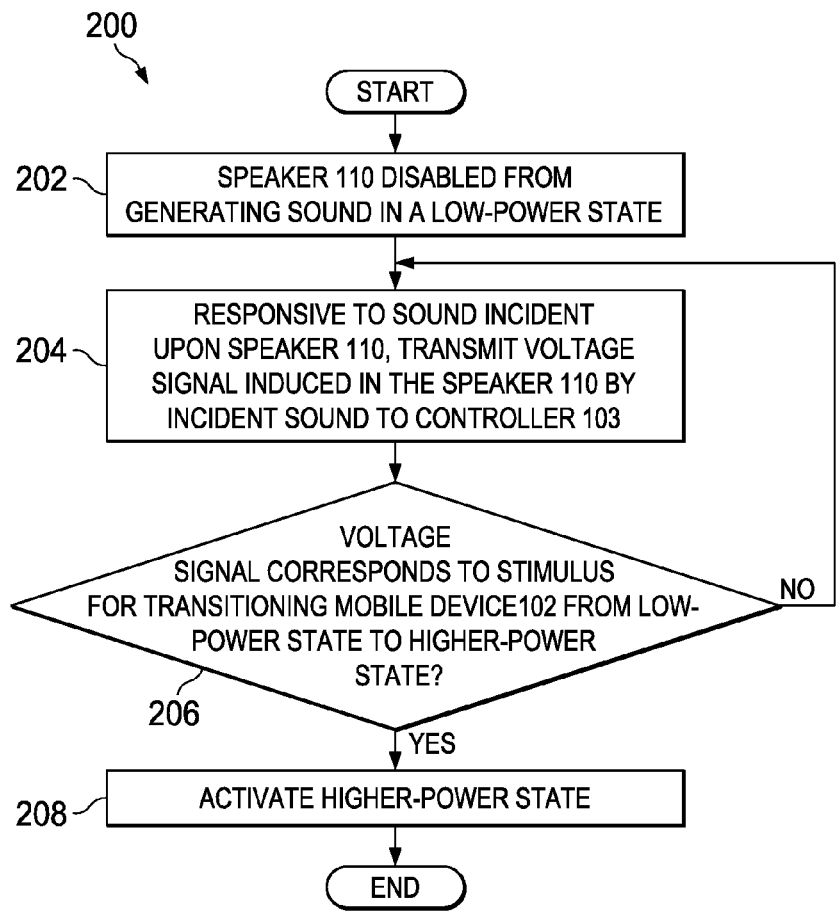
FIG. 2 illustrates a flow chart of an example method for using a speaker as a microphone in order to detect audio stimulus for waking a mobile device from a low-power state, in accordance with embodiments of the present disclosure.

FIG. 2 illustrates a flow chart of an example method 200 for using a speaker 110 as a microphone in order to detect audio stimulus for waking mobile device 102 from a low-power state, in accordance with embodiments of the present disclosure. According to one embodiment, method 200 begins at step 202. As noted above, teachings of the present disclosure are implemented in a variety of configurations of mobile device 102. As such, the preferred initialization point for method 200 and the order of the steps comprising method 200 may depend on the implementation chosen.

At step 202, a speaker 110 may be disabled from generating sound responsive to mobile device 102 entering a low-power state. At step 204, the speaker 110 may, responsive to sound incident upon speaker 110, transmit a voltage signal induced in the speaker 110 by the incident sound to controller 103.

At step 206, controller 103 may process the voltage signal and determine if the voltage signal corresponds to a stimulus (e.g., voice command) for transitioning mobile device 102 from a low-power state to a higher-power state. If the voltage signal corresponds to a stimulus for transitioning mobile device 102 from a low-power state to a higher-power state, method 200 may proceed to step 208. Otherwise, method 200 may proceed again to step 204.

At step 208, responsive to determining that the voltage signal corresponds to a stimulus for transitioning mobile device 102 from a low-power state to a higher-power state, controller 103 may activate the higher-power state by activating one or more components of mobile device 102 that may have been deactivated in the low-power state (e.g., capacitive microphone 106, user interface 105). After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using mobile device 102 or any other system operable to implement method 200. In certain embodiments, method 200 may be implemented partially or fully in software and/or firmware embodied in computer-readable media (e.g., memory 104) and executable by a controller (e.g., controller 103).

Figure 3:
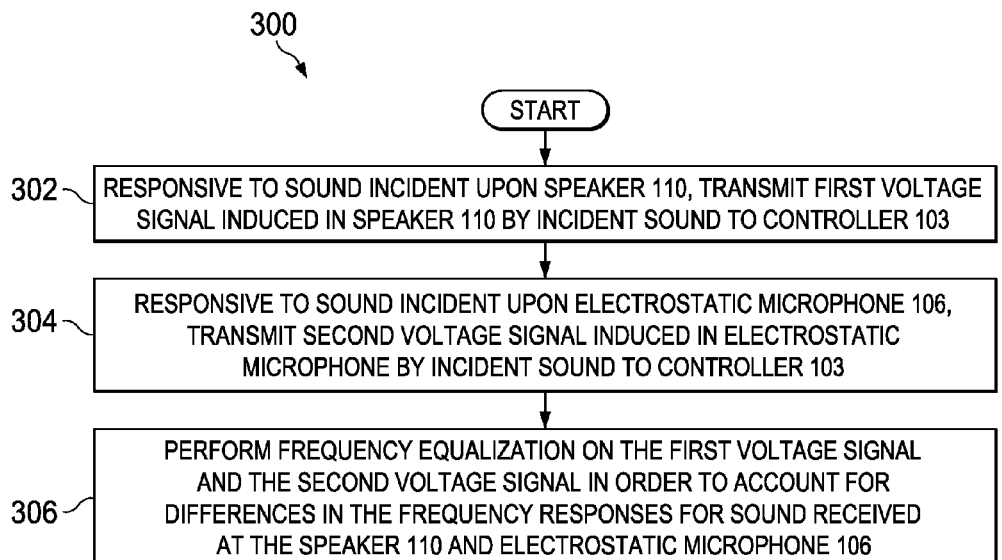
FIG. 3 illustrates a flow chart of an example method for using a speaker as a microphone at higher volume levels not suitable for reception by a capacitive microphone, in accordance with embodiments of the present disclosure.

FIG. 3 illustrates a flow chart of an example method 300 for using a speaker 110 as a microphone at higher volume levels not suitable for reception by capacitive microphone 106, in accordance with embodiments of the present disclosure. According to one embodiment, method 300 begins at step 302. As noted above, teachings of the present disclosure are implemented in a variety of configurations of mobile device 102. As such, the preferred initialization point for method 300 and the order of the steps comprising method 300 may depend on the implementation chosen.

At step 302, a speaker 110 may, responsive to sound incident upon speaker 110, transmit a first voltage signal induced in the speaker 110 by incident sound to controller 103. At step 304, a capacitive microphone 106 may, responsive to sound incident upon capacitive microphone 106, transmit a second voltage signal induced in capacitive microphone 106 by incident sound to controller 103.

At step 306, controller 103 may perform frequency equalization on the first voltage signal and the second voltage signal in order to account for differences in the frequency responses for sound received at the speaker 110 and capacitive microphone 106. Such frequency equalization may be accomplished using filters (e.g., a filter bank) as is known in the art. In particular embodiments, such filtering and frequency equalization may be adaptive, with an adaptive filtering algorithm performed by controller 103 during periods of time in which both capacitive microphone 106 is active (but not overloaded by the incident volume of sound) and a speaker 110 is used as a microphone. Once the frequency response is equalized, controller 103 may smoothly transition between the signals received from capacitive microphone 106 and speaker 110 by cross-fading between the two. After completion of step 306, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using mobile device 102 or any other system operable to implement method 300. In certain embodiments, method 300 may be implemented partially or fully in software and/or firmware embodied in computer-readable media (e.g., memory 104) and executable by a controller (e.g., controller 103).

Methods similar to that shown in FIG. 3 may also be used for employing a speaker 110 as a microphone at frequency ranges (e.g., low-frequency ranges) not suitable for reception by capacitive microphone 106, as described above.

Figure 4:
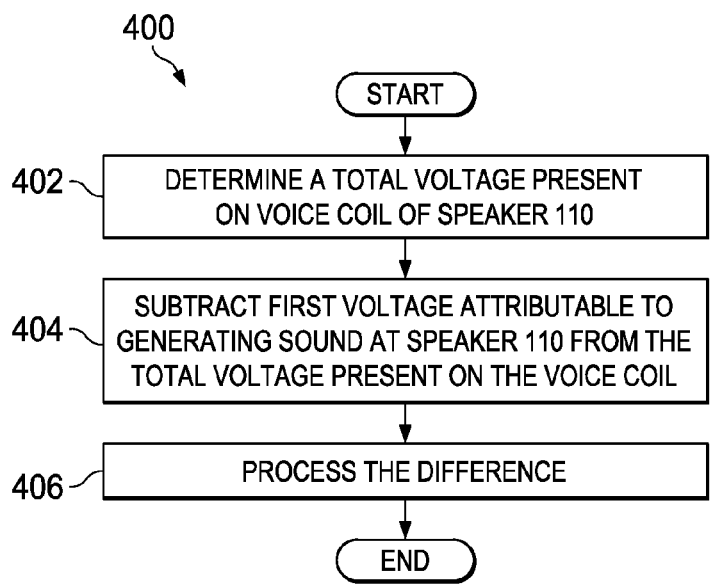
FIG. 4 illustrates a flow chart of an example method for simultaneously using a speaker as a speaker and a microphone such that the speaker may simultaneously emit sound while capturing sound, in accordance with embodiments of the present disclosure.

FIG. 4 illustrates a flow chart of an example method 400 for simultaneously using a speaker 110 as a speaker and a microphone such that the speaker 110 may simultaneously emit sound while capturing sound, in accordance with embodiments of the present disclosure. According to one embodiment, method 400 begins at step 402. As noted above, teachings of the present disclosure are implemented in a variety of configurations of mobile device 102. As such, the preferred initialization point for method 400 and the order of the steps comprising method 400 may depend on the implementation chosen.

At step 402, controller 103 may determine a total voltage present on a voice coil of a speaker 110. Such voltage may include the sum of two individual voltages: a first voltage transmitted (e.g., by controller 103) for generating sound from the speaker 110 and a second voltage induced by external sound incident on the speaker 110.

At step 404, controller 103 may subtract the first voltage (attributable to generating sound) from the total voltage present on the voice coil, with the remaining voltage being approximately equal to the second voltage induced by external sound incident on the speaker 110.

At step 406, controller 103 may process the second voltage in order to perform any suitable functionality responsive to such second voltage. After completion of step 406, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using mobile device 102 or any other system operable to implement method 400. In certain embodiments, method 400 may be implemented partially or fully in software and/or firmware embodied in computer-readable media (e.g., memory 104) and executable by a controller (e.g., controller 103).

Figure 5:
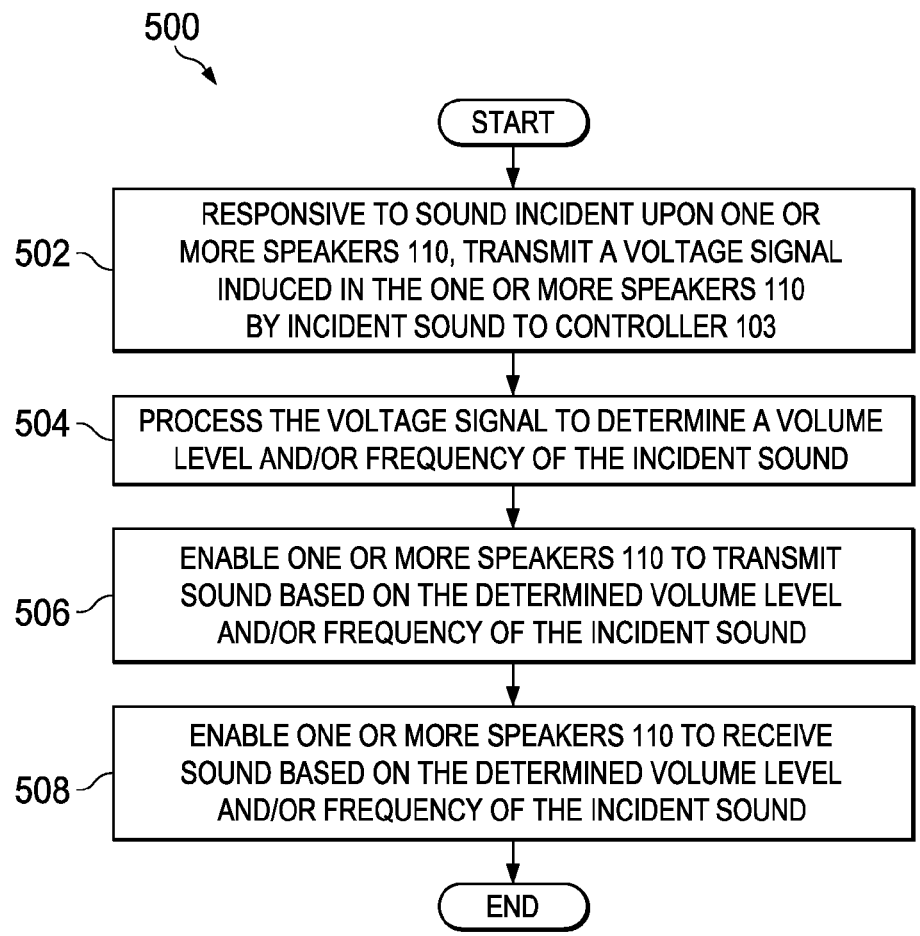
FIG. 5 illustrates a flow chart of an example method for selectively enabling speakers for transmitting sound or receiving sound, in accordance with embodiments of the present disclosure.

FIG. 5 illustrates a flow chart of an example method 500 for selectively enabling speakers 110 for transmitting sound or receiving sound, in accordance with embodiments of the present disclosure. According to one embodiment, method 500 begins at step 502. As noted above, teachings of the present disclosure are implemented in a variety of configurations of mobile device 102. As such, the preferred initialization point for method 500 and the order of the steps comprising method 500 may depend on the implementation chosen.

At step 502, one or more speakers 110 may, responsive to sound incident upon speakers 110, transmit a voltage signal induced in the speakers 110 by incident sound to controller 103. At step 504, controller 103 may process the voltage signal to determine a volume level and/or frequency of the incident sound.

At step 506, controller 103 may enable one or more speakers 110 to transmit sound (e.g., be used as a speaker)

based on the determined volume level and/or frequency of the incident sound. At step 508, controller 103 may enable one or more speakers 110 to receive sound (e.g., be used as a microphone) based on the determined volume level and/or frequency of the incident sound. After completion of step 508, method 500 may end.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using mobile device 102 or any other system operable to implement method 500. In certain embodiments, method 500 may be implemented partially or fully in software and/or firmware embodied in computer-readable media (e.g., memory 104) and executable by a controller (e.g., controller 103).

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A device comprising:
a speaker for generating sound;
a microphone; and
a controller communicatively coupled to the speaker and the microphone, and configured to:
receive a first signal from the speaker, the first signal induced at least in part by sound incident on the speaker other than sound generated by the speaker;
receive a second signal from the microphone, the second signal induced by sound incident on the microphone;
process at least one of the first signal and the second signal to determine at least one characteristic of sound incident upon at least one of the speaker and the microphone; and
select at least one of the microphone and the speaker as a signal source for incident sound based on the at least one characteristic.

2. The device of claim 1, wherein the first signal is a voltage signal.

3. The device of claim 1, wherein the controller is further configured to:
operate the speaker in a first mode wherein the controller communicates an output signal to the speaker for generating sound; and
operate the speaker in a second mode wherein the controller deactivates the speaker from emitting sound and receives the first signal induced by sound incident on the speaker other than sound generated by the speaker and processes the first signal.

4. The device of claim 1, wherein the controller is further configured to transition the device from a low-power state to a high-power state responsive to a determination that the first signal induced by sound incident on the speaker corresponds to stimulus for transitioning the device from a low-power state to a high-power state.

5. The device of claim 1, wherein the controller is further configured to:
perform frequency equalization on the first signal and the second signal in order to account for differences in the frequency responses to sound incident upon the speaker and the microphone.

6. The device of claim 1, wherein the at least one characteristic comprises a sound level.

7. The device of claim 1, wherein the controller is further configured to, based on sound incident at the speaker and sound incident on the microphone, perform beamforming to determine spatial selectivity of sounds incident on the device.

8. The device of claim 1, wherein the speaker is a dynamic speaker.

9. The device of claim 1, wherein the controller is further configured to select at least one of the microphone and the speaker as a signal source for incident sound based on the characteristic comprises selecting at least one of the microphone and the speaker as a signal source based on a volume of sound incident on at least one of the microphone and the speaker and an operational mode of the device.

10. A method comprising:
generating, by a speaker, a first signal, the first signal induced at least in part by sound incident on the speaker other than sound generated by the speaker;
receiving a second signal from a microphone, the second signal induced by sound incident on the microphone;
processing at least one of the first signal and the second signal to determine at least one characteristic of sound incident upon at least one of the speaker and the microphone; and
selecting at least one of the microphone and the speaker as a signal source for incident sound based on the at least one characteristic.

11. The method of claim 10, wherein the first signal is a voltage signal.

12. The method of claim 10, further comprising:
operating the speaker in a first mode wherein a controller of a device comprising the speaker and the microphone communicates an output signal to the speaker for generating sound; and
operating the speaker in a second mode wherein the controller deactivates the speaker from emitting sound and receives the first signal induced by sound incident on the speaker other than sound generated by the speaker and processes the signal.

13. The method of claim 10, further comprising transitioning a device comprising the speaker and the microphone device from a low-power state to a high-power state responsive to a determination that the first signal induced by sound incident on the speaker corresponds to stimulus for transitioning the device from a low-power state to a high-power state.

14. The method of claim 10, further comprising:
performing frequency equalization on the first signal and the second signal in order to account for differences in frequency responses to sound incident upon the speaker and the microphone.

15. The method of claim 10, wherein the at least one characteristic comprises a sound level.

16. The method of claim 10, further comprising:
based on sound incident at the speaker and sound incident on the microphone, performing beamforming to determine spatial selectivity of sounds incident on a device comprising the speaker and the microphone.

17. The method of claim 10, wherein the speaker is a dynamic speaker.

18. The method of claim 10, wherein selecting at least one of the microphone and the speaker as a signal source for incident sound based on the characteristic comprises selecting at least one of the microphone and the speaker as a signal source based on a volume of sound incident on at least one of the microphone and the speaker and an operational mode of a device comprising the speaker and the microphone.

19. An integrated circuit comprising:
a first input configured to receive a first signal from a speaker, the first signal induced at least in part by sound incident on the speaker other than sound generated by the speaker;
a second input configured to receive a second signal from a microphone, the second signal induced by sound incident on the microphone; and
a processing circuit configured to:
process at least one of the first signal and the second signal to determine at least one characteristic of sound incident upon at least one of the speaker and the microphone; and
select at least one of the microphone and the speaker as a signal source for incident sound based on the at least one characteristic.

20. The integrated circuit of claim 19, wherein the first signal is a voltage signal.

21. The integrated circuit of claim 19, wherein the processing circuit is further configured to:
operate the speaker in a first mode wherein the processing circuit communicates an output signal to the speaker for generating sound; and
operate the speaker in a second mode wherein the processing circuit deactivates the speaker from emitting sound and receives the first signal induced by sound incident on the speaker other than sound generated by the speaker and processes the first signal.

22. The integrated circuit of claim 19, wherein the processing circuit is further configured to transition a device from a low-power state to a high-power state responsive to a determination that the first signal induced by sound incident on the speaker corresponds to stimulus for transitioning the device from a low-power state to a high-power state.

23. The integrated circuit of claim 19, wherein the processing circuit is further configured to:
perform frequency equalization on the first signal and the second signal in order to account for differences in frequency responses to sound incident upon the speaker and the microphone.

24. The integrated circuit of claim 19, wherein the at least one characteristic comprises a sound level.

25. The integrated circuit of claim 19, wherein the processing circuit is further configured to, based on sound incident at the speaker and sound incident on the microphone, perform beamforming to determine spatial selectivity of sounds incident on a device.

26. The integrated circuit of claim 19, wherein the speaker is a dynamic speaker.

27. The integrated circuit of claim 19, wherein the processing circuit is further configured to select at least one of the microphone and the speaker as a signal source for incident sound based on the characteristic, comprising selecting at least one of the microphone and the speaker as a signal source based on a volume of sound incident on at least one of the microphone and the speaker and an operational mode of a device.

* * * * *